(12) United States Patent
Regev et al.

(10) Patent No.: US 11,915,012 B2
(45) Date of Patent: Feb. 27, 2024

(54) APPLICATION PRELOADING IN THE PRESENCE OF USER ACTIONS

(71) Applicant: TENSERA NETWORKS LTD., Hod Hasharon (IL)

(72) Inventors: Eilon Regev, Givatayim (IL); Roee Peled, Givatayim (IL); David Ben Eli, Modiin (IL); Daniel Yellin, Raanana (IL); Shimon Moshavi, Beit Shemesh (IL)

(73) Assignee: TENSERA NETWORKS LTD., Tel Aviv (IL)

( * ) Notice: Subject to any disclaimer, the term of this patent is extended or adjusted under 35 U.S.C. 154(b) by 674 days.

(21) Appl. No.: 16/968,652

(22) PCT Filed: Mar. 4, 2019

(86) PCT No.: PCT/IB2019/051707
§ 371 (c)(1),
(2) Date: Aug. 10, 2020

(87) PCT Pub. No.: WO2019/171237
PCT Pub. Date: Sep. 12, 2019

(65) Prior Publication Data
US 2020/0401418 A1 Dec. 24, 2020

Related U.S. Application Data

(60) Provisional application No. 62/801,145, filed on Feb. 5, 2019, provisional application No. 62/638,321, filed on Mar. 5, 2018.

(51) Int. Cl.
*G06F 1/24* (2006.01)
*G06F 9/445* (2018.01)
(Continued)

(52) U.S. Cl.
CPC .......... *G06F 9/44505* (2013.01); *G06F 9/547* (2013.01); *G06F 11/3438* (2013.01); *G06F 9/4401* (2013.01)

(58) Field of Classification Search
CPC .. G06F 9/44505; G06F 9/547; G06F 11/3438; G06F 9/445; G06Q 20/3552; G06Q 20/3563; G06Q 20/3672
(Continued)

(56) References Cited

U.S. PATENT DOCUMENTS 6,038,596 A 3/2000 Baldwin et al.
6,807,570 B1 10/2004 Allen et al.
(Continued)

FOREIGN PATENT DOCUMENTS

CN 102063302 A 5/2011
CN 108681475 A * 10/2018 ......... G06F 9/44521
(Continued)

OTHER PUBLICATIONS

International Application # PCT/IB2019/051707 Search Report dated Jun. 27, 2019.
(Continued)

*Primary Examiner* — Volvick Derose
(74) *Attorney, Agent, or Firm* — Kligler & Associates Patent Attorneys Ltd.

(57) ABSTRACT

A method includes, in a processor (44) of a user device (24), preloading one or more user applications (26) in a background mode, in which activities associated with preloaded user applications are hidden from a user of the user device. An activity, which is invoked in the processor and is associated with a given preloaded user application, is detected. An assessment is made by the processor, whether the activity is a preload-initiated activity that is invoked due to preloading of the given user application, or whether the
(Continued)

activity is a user-initiated activity that is invoked due to an action by the user. If the activity is assessed to be a preload-initiated activity, the activity is handled using a first handling scheme. If the activity is assessed to be a user-initiated activity, the activity is handled using a second handling scheme, different from the first handling scheme.

34 Claims, 2 Drawing Sheets

(51) Int. Cl.
  *G06F 9/54* (2006.01)
  *G06F 11/34* (2006.01)
  *G06F 9/4401* (2018.01)
(58) Field of Classification Search
  USPC .......................................................... 713/100
  See application file for complete search history.

(56) References Cited

U.S. PATENT DOCUMENTS

| | | | |
|---|---|---|---|
| 7,703,133 B1 | 4/2010 | Balasubramanian et al. | |
| 8,140,997 B2 | 3/2012 | Nemoto | |
| 8,250,228 B1 | 8/2012 | Johansson | |
| 8,341,245 B1 | 12/2012 | Roskind et al. | |
| 8,418,190 B2 | 4/2013 | Rivard et al. | |
| 8,881,033 B2 | 11/2014 | Mentchoukov et al. | |
| 9,385,914 B1 | 7/2016 | Britto et al. | |
| 9,513,888 B1 | 12/2016 | Fultz et al. | |
| 9,565,233 B1 | 2/2017 | Ozuysal et al. | |
| 9,959,506 B1 | 5/2018 | Karppanen | |
| 9,961,159 B2 | 5/2018 | Yellin et al. | |
| 9,979,796 B1 | 5/2018 | Yellin et al. | |
| 10,013,497 B1 | 7/2018 | Boodman | |
| 10,432,748 B2 | 10/2019 | Yellin et al. | |
| 10,459,887 B1* | 10/2019 | Dvortsov | G06F 3/0362 |
| 10,613,735 B1 | 4/2020 | Karpe et al. | |
| 11,095,743 B2 | 8/2021 | Yellin et al. | |
| 11,128,729 B2 | 9/2021 | Yellin et al. | |
| 11,715,084 B1 | 8/2023 | Dixon et al. | |
| 2003/0101234 A1 | 5/2003 | McBrearty et al. | |
| 2003/0195940 A1 | 10/2003 | Basu et al. | |
| 2003/0220984 A1* | 11/2003 | Jones | H04L 67/51 709/219 |
| 2004/0030882 A1 | 2/2004 | Forman | |
| 2005/0066283 A1 | 3/2005 | Kanamaru | |
| 2005/0132302 A1 | 6/2005 | Cina | |
| 2006/0026636 A1 | 2/2006 | Stark et al. | |
| 2006/0101514 A1 | 5/2006 | Milener et al. | |
| 2006/0111920 A1 | 5/2006 | Jacobs et al. | |
| 2008/0307339 A1 | 12/2008 | Boro et al. | |
| 2009/0006671 A1 | 1/2009 | Batson et al. | |
| 2009/0037393 A1 | 2/2009 | Fredricksen et al. | |
| 2010/0058248 A1 | 3/2010 | Park | |
| 2011/0211813 A1 | 9/2011 | Marks | |
| 2011/0249668 A1 | 10/2011 | Van Milligan et al. | |
| 2012/0023226 A1 | 1/2012 | Petersen et al. | |
| 2012/0023506 A1 | 1/2012 | Maeckel et al. | |
| 2012/0084343 A1 | 4/2012 | Mir et al. | |
| 2012/0137296 A1* | 5/2012 | Chen | G06F 9/445 718/100 |
| 2012/0159393 A1 | 6/2012 | Sethi | |
| 2012/0167122 A1 | 6/2012 | Koskimies | |
| 2012/0278432 A1 | 11/2012 | Luna | |
| 2012/0317188 A1 | 12/2012 | Fredricksen et al. | |
| 2012/0323908 A1 | 12/2012 | Herbert, Jr et al. | |
| 2012/0324481 A1* | 12/2012 | Xia | G06F 9/485 719/320 |
| 2012/0329089 A1 | 12/2012 | Edrei et al. | |
| 2013/0019159 A1* | 1/2013 | Civelli | H04L 67/02 715/234 |
| 2013/0031204 A1 | 1/2013 | Graham et al. | |
| 2013/0120294 A1 | 5/2013 | Sun et al. | |
| 2013/0173513 A1* | 7/2013 | Chu | G06F 9/451 706/14 |
| 2013/0185633 A1 | 7/2013 | Bunker et al. | |
| 2013/0238751 A1 | 9/2013 | Raleigh et al. | |
| 2013/0263023 A1 | 10/2013 | Goodwin et al. | |
| 2013/0275899 A1 | 10/2013 | Schubert et al. | |
| 2013/0283283 A1 | 10/2013 | Wang et al. | |
| 2014/0053057 A1 | 2/2014 | Reshadi et al. | |
| 2014/0094163 A1 | 4/2014 | Widdowson et al. | |
| 2014/0162793 A1 | 6/2014 | Quan et al. | |
| 2014/0188932 A1 | 7/2014 | Kalita et al. | |
| 2014/0201673 A1 | 7/2014 | Dunn | |
| 2014/0280485 A1 | 9/2014 | A Hummaida et al. | |
| 2014/0359442 A1* | 12/2014 | Lin | G06F 3/0484 715/716 |
| 2014/0372356 A1* | 12/2014 | Bilal | G06N 5/02 706/46 |
| 2014/0373032 A1 | 12/2014 | Merry et al. | |
| 2015/0026415 A1 | 1/2015 | Clausen et al. | |
| 2015/0045921 A1 | 2/2015 | Stewart et al. | |
| 2015/0046519 A1 | 2/2015 | Shukla et al. | |
| 2015/0193395 A1 | 7/2015 | Nicolaou et al. | |
| 2015/0207852 A1* | 7/2015 | Boodman | G06F 21/57 715/234 |
| 2015/0208205 A1 | 7/2015 | Chan et al. | |
| 2015/0215816 A1 | 7/2015 | Abou-Elkheir et al. | |
| 2015/0281147 A1 | 10/2015 | Wang et al. | |
| 2015/0347615 A1 | 12/2015 | McGushion et al. | |
| 2015/0371142 A1 | 12/2015 | Jain | |
| 2015/0372933 A1 | 12/2015 | Cai et al. | |
| 2016/0012104 A1 | 1/2016 | Petrov | |
| 2016/0057167 A1 | 2/2016 | Bach | |
| 2016/0085583 A1 | 3/2016 | Goodson | |
| 2016/0103608 A1 | 4/2016 | Nukala et al. | |
| 2016/0227464 A1 | 8/2016 | Senarath et al. | |
| 2016/0259623 A1* | 9/2016 | Sumner | G06F 3/167 |
| 2016/0259656 A1 | 9/2016 | Sumner et al. | |
| 2016/0344679 A1 | 11/2016 | Lane et al. | |
| 2017/0011681 A1 | 1/2017 | Bathiche et al. | |
| 2017/0031869 A1 | 2/2017 | Franczyk et al. | |
| 2017/0032568 A1 | 2/2017 | Gharpure et al. | |
| 2017/0046235 A1 | 2/2017 | Straub et al. | |
| 2017/0126833 A1 | 5/2017 | DeLuca et al. | |
| 2017/0278477 A1 | 9/2017 | Jeong et al. | |
| 2017/0293465 A1 | 10/2017 | Kotteri et al. | |
| 2017/0371685 A1 | 12/2017 | Tanaka et al. | |
| 2018/0129537 A1 | 5/2018 | Kurtzman et al. | |
| 2018/0212741 A1 | 7/2018 | Lindoff et al. | |
| 2018/0241837 A1 | 8/2018 | Yellin et al. | |
| 2018/0246862 A1 | 8/2018 | Burkard et al. | |
| 2018/0293087 A1 | 10/2018 | Lee et al. | |
| 2018/0364890 A1 | 12/2018 | Lee et al. | |
| 2019/0065144 A1 | 2/2019 | Sumner et al. | |
| 2019/0087205 A1 | 3/2019 | Guday | |
| 2019/0100152 A1 | 4/2019 | Shastry | |
| 2019/0188005 A1 | 6/2019 | Chen et al. | |
| 2019/0188012 A1 | 6/2019 | Chen et al. | |
| 2019/0188013 A1 | 6/2019 | Krishna et al. | |
| 2019/0196849 A1 | 6/2019 | Chen et al. | |
| 2019/0205159 A1* | 7/2019 | Wen | G06F 9/542 |
| 2019/0221224 A1 | 7/2019 | Heitkamp et al. | |
| 2019/0361581 A1 | 11/2019 | Wang et al. | |
| 2019/0370022 A1 | 12/2019 | Han et al. | |
| 2019/0370095 A1 | 12/2019 | Chen et al. | |
| 2020/0159597 A1 | 5/2020 | Yellin et al. | |
| 2020/0159816 A1 | 5/2020 | Bostrom et al. | |
| 2020/0183822 A1 | 6/2020 | Bates | |
| 2020/0225818 A1 | 7/2020 | Ozuysal | |
| 2020/0336514 A1 | 10/2020 | Momchilov et al. | |
| 2020/0342338 A1 | 10/2020 | Huang | |
| 2020/0401418 A1 | 12/2020 | Regev et al. | |
| 2021/0103447 A1 | 4/2021 | Wei et al. | |
| 2021/0149689 A1 | 5/2021 | Jung et al. | |
| 2021/0224085 A1 | 7/2021 | Moore | |
| 2021/0304096 A1 | 9/2021 | Kirubakaran et al. | |
| 2021/0329088 A1 | 10/2021 | Yellin et al. | |
| 2021/0329090 A1 | 12/2021 | Yellin et al. | |
| 2021/0329091 A1 | 12/2021 | Yellin et al. | |
| 2021/0385295 A1 | 12/2021 | Yellin et al. | |

(56) References Cited

U.S. PATENT DOCUMENTS

| | | | |
|---|---|---|---|
| 2022/0210264 A1 | 6/2022 | Jung et al. | |
| 2022/0221998 A1 | 7/2022 | Xu | |
| 2022/0413695 A1 | 12/2022 | Guan et al. | |
| 2023/0018798 A1 | 1/2023 | Coffman et al. | |
| 2023/0135295 A1 | 5/2023 | Cha et al. | |

FOREIGN PATENT DOCUMENTS

| | | | | |
|---|---|---|---|---|
| CN | 108681475 A | 10/2018 | | |
| CN | 108920156 A | 11/2018 | | |
| CN | 108958828 A | 12/2018 | | |
| KR | 20160116910 A | 10/2016 | | |
| WO | 2015169188 A1 | 11/2015 | | |
| WO | 2018055506 A1 | 3/2018 | | |
| WO | 2018234967 A1 | 12/2018 | | |
| WO | 2019082042 A1 | 5/2019 | | |
| WO | WO-2019171237 A1 * | 9/2019 | .......... | G06F 11/3438 |
| WO | 2021161174 A1 | 8/2021 | | |

OTHER PUBLICATIONS

KR Application # 10-2017-7002520 Office Action dated Nov. 25, 2020.
International Application # PCT/IB2020/057046 Search Report dated Nov. 17, 2020.
U.S. Appl. No. 16/332,005 Office Action dated Dec. 18, 2020.
U.S. Appl. No. 16/537,577 Office Action dated Feb. 3, 2021.
U.S. Appl. No. 16/332,005 Office Action dated Apr. 2, 2021.
U.S. Appl. No. 17/567,183 Office Action dated Dec. 30, 2022.
U.S. Appl. No. 17/739,122 Office Action dated Feb. 1, 2023.
EP Application # 20845959.4 Search Report dated Feb. 2, 2023.
U.S. Appl. No. 17/624,357 Office Action dated Mar. 13, 2023.
U.S. Appl. No. 17/567,187 Office Action dated Mar. 27, 2023.
International Application # PCT/IB2021/051055 Search Report dated May 20, 2021.
U.S. Appl. No. 17/363,039 Office Action dated May 11, 2022.
International Application # PCT/IB2022/050581 Search Report dated May 25, 2022.
International Application # PCT/IB2022/051531 Search Report dated Jun. 19, 2022.
U.S. Appl. No. 17/403,908 Office Action dated Jul. 21, 2022.
U.S. Appl. No. 17/363,047 Office Action dated Jul. 26, 2022.
U.S. Appl. No. 17/363,047 Office Action dated Feb. 11, 2022.
U.S. Appl. No. 17/363,036 Office Action dated Mar. 4, 2022.
U.S. Appl. No. 17/363,058 Office Action dated Mar. 21, 2022.
"Understand the Activity Lifecycle," Android Developers, pp. 1-21, last updated Oct. 27, 2021, as downloaded from https://developer.android.com/guide/components/activities/activity-lifecycle.
International Application # PCT/IB2021/060789 Search Report dated Mar. 21, 2022.
International Application # PCT/IB2021/061606 Search Report dated Apr. 7, 2022.
Lee et al., "CAS: Context-Aware Background Application Scheduling in Interactive Mobile Systems," IEEE Journal on Seleted Areas in Communications, vol. 35, No. 5, pp. 1013-1029, May 2017.
U.S. Appl. No. 17/849,644 Office Action dated Oct. 5, 2023.
CN Application # 2021800134875 Office Action dated Dec. 12, 2023.
U.S. Appl. No. 17/582,025 Office Action dated Nov. 6, 2023.
U.S. Appl. No. 17/797,130 Office Action dated Dec. 26, 2023.

* cited by examiner

APPLICATION PRELOADING IN THE PRESENCE OF USER ACTIONS

CROSS-REFERENCE TO RELATED APPLICATIONS

This application is U.S. National Phase of PCT Application PCT/IB2019/051707, filed Mar. 4, 2019, which claims the benefit of U.S. Provisional Patent Application 62/638,321, filed Mar. 5, 2018, and U.S. Provisional Patent Application 62/801,145, filed Feb. 5, 2019. The disclosures of these related applications are incorporated herein by reference.

FIELD OF THE INVENTION

The present invention relates generally to communication systems, and particularly to methods and systems for background preloading of applications ("apps") and handling of preloaded apps.

BACKGROUND OF THE INVENTION

Various techniques are known in the art for running applications ("apps") in user devices in a manner that improves user experience. For example, PCT International Publication WO 2018/055506, entitled "An optimized CDN for the wireless last mile," describes techniques that involve preloading an application installed in a user device, before a user requests to activate the application.

SUMMARY OF THE INVENTION

An embodiment of the present invention that is described herein provides a method including, in a processor of a user device, preloading one or more user applications in a background mode, in which activities associated with preloaded user applications are hidden from a user of the user device. An activity, which is invoked in the processor and is associated with a given preloaded user application, is detected. An assessment is made by the processor, whether the activity is a preload-initiated activity that is invoked due to preloading of the given user application, or whether the activity is a user-initiated activity that is invoked due to an action by the user. If the activity is assessed to be a preload-initiated activity, the activity is handled using a first handling scheme. If the activity is assessed to be a user-initiated activity, the activity is handled using a second handling scheme, different from the first handling scheme.

In some embodiments, assessing whether the activity is preload-initiated or user-initiated is performed by a preloading agent, which is configured to preload the user applications. In example embodiments, the preloading agent is implemented as one of (i) a software component of an operating system of the user-device, (ii) an application, and (iii) a Software Development Kit (SDK) embedded in an application. In another embodiment, assessing whether the activity is preload-initiated or user-initiated is performed by the given user application.

In some embodiment, assessing whether the activity is preload-initiated or user-initiated includes applying a predefined heuristic. In an embodiment, applying the predefined heuristic includes assessing that the activity is preload-initiated if the activity is invoked by another activity associated with the given preloaded user application. In another embodiment, applying the predefined heuristic includes assessing that the activity is user-initiated if the activity is not invoked by another activity associated with the given preloaded user application. In yet another embodiment, applying the predefined heuristic includes assessing that the activity is preload-initiated if a screen of the user device is off during invocation of the activity. In still another embodiment, applying the predefined heuristic includes assessing that the activity is user-initiated if the activity is invoked more than a predefined time period after preloading of the given user application. In a disclosed embodiment, applying the predefined heuristic includes assessing that the activity is preload-initiated if the activity is invoked less than a predefined time period after preloading of the given user application.

In some embodiments, preloading the user applications includes evaluating a predefined preloading-blocking condition, and permitting preloading of the user applications only if the preloading-blocking condition is not met, and assessing whether the activity is preload-initiated or user-initiated includes assessing that the activity is user-initiated if the preloading-blocking condition is met during invocation of the activity.

In a disclosed embodiment, assessing whether the activity is preload-initiated or user-initiated includes receiving from the given preloaded user application, via an Application Programming Interface (API), an indication of whether the activity is preload-initiated or user-initiated.

In an embodiment, handling the activity includes: sending to the given preloaded user application, via an Application Programming Interface (API), an indication of whether the given user application is currently in a preloaded state; and, in the given preloaded user application, based on the indication, applying the first handling scheme if in the preloaded state, and applying the second handling scheme if not in the preloaded state.

In another embodiment, handling the activity includes: if the activity is assessed to be user-initiated, executing analytics code that tracks usage of the app by the user; and if the activity is assessed to be preload-initiated, not executing the analytics code. In yet another embodiment, handling the activity includes: if the activity is assessed to be user-initiated, presenting audio-visual output of the activity to the user; and if the activity is assessed to be preload-initiated, inhibiting the audio-visual output of the activity.

In a disclosed embodiment, handling the activity includes assigning to the new activity a first execution priority if the activity is assessed to be user-initiated, and, if the activity is assessed to be preload-initiated, assigning to the new activity a second execution priority that is lower than the first execution priority.

In some embodiments, the method further includes determining whether or not the given preloaded user application is in a preloaded state, based on whether the detected activity is assessed to be preload-initiated or user-initiated. In an embodiment, the method further includes deciding, based on whether the given preloaded user application is determined to be in the preloaded state, whether to handle at least one other activity associated with the given preloaded user application using the first handling scheme or using the second handling scheme.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for preloading apps and handling preloaded apps. In the present context, the term "preloading an app" refers to the process of loading and launching an app in a background mode, not in response to (and typically before) invocation of the app by the user. In the background mode, activities associated with the app are not presented to the user, i.e., are hidden from the user.

When the user invokes a previously-preloaded app, the processor switches to run the app in a foreground mode that is visible to the user. (The terms "background mode" and "foreground mode" are referred to herein simply as "background" and "foreground," for brevity.) The time needed for switching to the foreground is typically much shorter than the time needed for loading and running the app from scratch. As a result, the app starts almost immediately from the user's perspective, resulting in superior user experience.

Some embodiments described herein address the challenge of simultaneously handling, for the same app, activities that are created due to preloading, and activities that are created due to user actions. The term "activity" refers to a user interface (UI) screen associated with an app that is invoked (i.e., whose creation is triggered) and is typically used by the app to enable interaction with the user. An activity, also sometimes referred to as a "screen," "screen component" or "view," typically displays some visual output to the user and may request user input.

An activity may be invoked due to a user action (e.g., the user clicks on an app icon which triggers the launch of the app and creation of the activity that displays the app's landing page), or it may be invoked due to a programmatic trigger by a software component (e.g., the OS, the app, or another activity) unrelated to a specific user action. (Although the term "Activity" is commonly used in association with the Android™ operating system, the term is used herein in a general sense. The disclosed techniques are in no way limited to any specific operating system or environment.)

In various practical scenarios, while a preloaded app is running in the background, the user performs some user action that triggers the creation of one or more activities associated with the same app. For example, the user may react to (e.g., click on) a notification sent by the app's portal, independently of the fact that the app is also preloaded and runs in the background. As another example, the user may click on an app widget, or enter the app through another app.

The above scenarios, and various others, result in one or more activities that are created due to preloading of the app (referred to as "preload-initiated activities") and one or more activities that are created due to user action (referred to as "user-initiated activities"). Both the preload-initiated activities and the user-initiated activities may run at the same time on the processor of the user device.

In order to handle the various activities properly, (possibly including the handling of their creation), it is important for the processor to distinguish between preload-initiated activities and user-initiated activities of an app. In practice, however, an explicit distinction may not be readily available.

In some cases an explicit distinction between preload-initiated activities and user-initiated activities may be available, but obtaining it incurs high computational overhead or implementation complexity.

Thus, in some embodiments of the present invention, the processor of the user device detects a trigger to create an activity which runs in the processor and is associated with a given user application. In absence of an accurate, explicit indication, the processor assesses whether the activity is being created due to preloading of the given user application or due to an action by the user. If the activity is assessed to have been initiated due to preloading, the processor handles the activity using a first handling scheme. If the activity is assessed to have been initiated due to an action by the user, the processor handles the activity using a second handling scheme, different from the first handling scheme.

The assessment process above may be performed, for example, by a preloading agent that runs in the processor independently of the user applications. Such a preloading agent may be implemented, for example, as a software component of the user-device operating system (OS), as a separate app, or as a Software Development Kit (SDK) embedded in an app.

Various example criteria and heuristics for assessing whether an activity is preload-initiated or user-initiated are described herein. Examples of handling schemes that differ between preload-initiated activities and user-initiated activities are also described.

System Description

Figure 1:
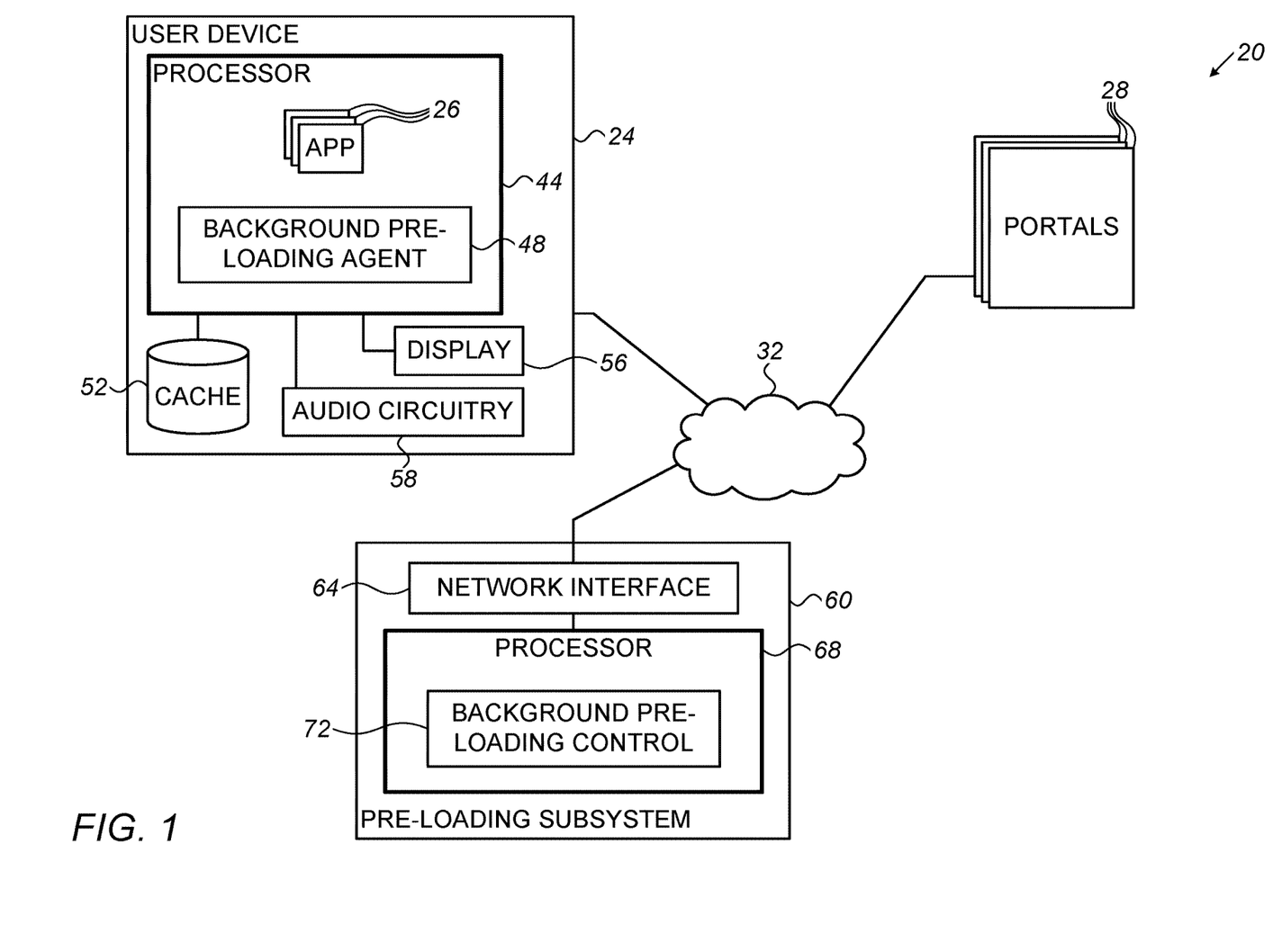
FIG. 1 is a block diagram that schematically illustrates a communication system that uses application preloading, in accordance with an embodiment of the present invention.

FIG. 1 is a block diagram that schematically illustrates a communication system that uses application preloading, in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a smart TV, a wearable device, an automotive user device, or any other suitable type of user device that is capable of communicating over a network and presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs apps 26, and also runs a software component referred to as a preloading agent 48, which handles preloading of apps. In addition, user device 24 comprises a cache memory 52 for caching content associated with apps. Cache 52 is typically managed by agent 48. In some embodiments the user device uses a single cache 52. In other embodiments, a separate cache memory 52 may be defined per app.

User device 24 further comprises a display screen 56 for presenting visual content to the user, and audio circuitry 58 for playing audio content to the user. The audio circuitry may comprise, for example, an audio decoder, digital-to-analog conversion circuitry, audio amplification circuitry, and an audio output device such as a speaker or headset interface.

User device 24 typically also comprises a suitable network interface (not shown in the figure) for connecting to network 32. This network interface may be wired (e.g., an Ethernet Network Interface Controller—NIC) or wireless (e.g., a cellular modem or a Wi-Fi modem).

Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a preloading subsystem 60 that performs preloading tasks on the network side. Subsystem 60 comprises a network interface 64 for communicating over network 32, and a processor 68 that carries out the various processing tasks of the preloading subsystem. In the present example, processor 68 runs a preloading control unit 72 that carries out network-side preloading tasks. Network-side preloading tasks may comprise, for example, deciding which apps to preload and when, choosing whether and which in-app content to preload, deciding how much of an app component to preload (e.g., only executing some initial executable code, or pre-rendering of the app's user interface), to name just a few examples. In an embodiment, preloading subsystem 60 may be implemented as a cloud-based application.

In the embodiments described herein, for the sake of clarity, the preloading tasks are described as being carried out by processor 44 of user device 24. Generally, however, preloading tasks may be carried out by processor 44 of device 24, by processor 68 of subsystem 60, or both. Thus, any reference to "processor" below may refer, in various embodiments, to processor 44, processor 68, or both. Preloading an app may involve preloading any app element such as executable code associated with the app, e.g., launch code, app feed, app landing page, various user-interface elements associated with the app, content associated with the app, app data associated with the app, and/or code or content that is reachable using the app by user actions such as clicks ("in-app content").

The configurations of system 20 and its various elements shown in FIG. 1 are example configurations, which are chosen purely for the sake of conceptual clarity. In alternative embodiments, any other suitable configurations can be used. For example, in some embodiments the preloading tasks may be implemented entirely in processor 44 of user device 24, in which case subsystem 60 may be eliminated altogether.

Preloading agent 48 may be implemented in a software module running on processor 44, in an application running on processor 44, in a Software Development Kit (SDK) embedded in an application running on processor 44, by the Operating System (OS) running on processor 44, or in any other suitable manner.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Handling of Preload-Initiated and User-Initiated Activities

Running an app in user device 24, whether preloaded or user-initiated, in the background or in the foreground, typically involves running one or more activities by processor 44. Examples of activities comprise a main activity of the app, a "Splash" screen (an initial screen that is displayed while the main activity is being loaded or prepared), an interstitial advertisement that is displayed upon transition between screens, a screen triggered by the user clicking on a notification from an app's portal, or any other suitable type of activity.

In some practical scenarios, a user-initiated activity may be invoked while one or more preload-initiated activities are running on processor 44; similarly, a preload-initiated activity may be invoked while one or more user-initiated activities are running on processor 44.

Consider, for example, a preloaded app that is running in the background. As part of running the preloaded app, preloading agent 48 may, for example, invoke a Splash activity that loads the app. The Splash activity may invoke a main activity of the app, e.g., a landing page, and the main activity may invoke an interstitial ad activity. As another example, preloading agent 48 may directly invoke the main activity that in turn invokes an interstitial ad activity. All of these activities are preload-initiated activities.

While one or more such preload-initiated activities are running, the user of user device 24 may, for example, click on a notification window of the same app that is unrelated to the preload operation. The notification may originate, for example, from a portal 28. This user action may invoke one or more user-initiated activities of the same app, which are unrelated to the preload. For example, the user click may open some content item within the app in a separate activity. As another example, the user may click on a widget of the app, which triggers creation of an app activity unrelated to the preload. As yet another example, the user may enter the app in question from within another app, so as to again invoke an app activity unrelated to the preload.

The above scenarios are depicted purely by way of example, to demonstrate how processor 44 may need to handle preload-initiated activities and user-initiated activities of the same app at the same time. The techniques described herein are applicable in these example scenarios and in any other suitable scenario.

In some embodiments, in order to handle the various activities properly, it is important to distinguish between preload-initiated activities and user-initiated activities. In practice, however, preloading agent 48 does not always have, or have straightforward access to, an explicit distinction between the two activity types. In some cases the app itself may not have this information either, or may not have straightforward access.

In some embodiments of the present invention, preloading agent 48 uses various techniques, heuristics or criteria to assess whether a newly-invoked activity is preload-initiated or user-initiated. The preload agent handles the activity differently, depending on the assessment.

For the sake of clarity, the description that follows refers to agent 48 as the entity that uses the disclosed techniques for distinguishing between preload-initiated activities and user-initiated activities. In alternative embodiments, however, this assessment or distinction can be performed by any other suitable software running in processor 44, e.g., by the app itself.

Figure 2:
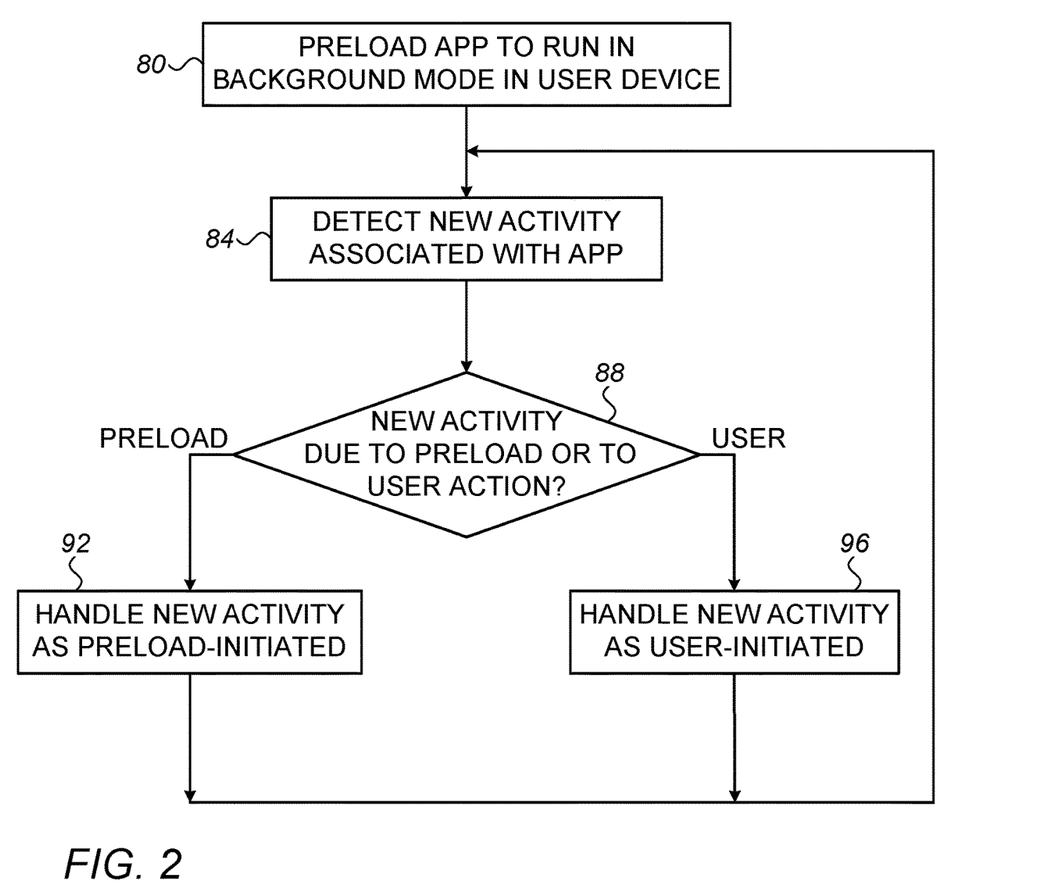
FIG. 2 is a flow chart that schematically illustrates a method for handling of preloaded and user-initiated application activities, in accordance with an embodiment of the present invention.

FIG. 2 is a flow chart that schematically illustrates a method for handling of preloaded and user-initiated application activities, in accordance with an embodiment of the present invention. The method begins with preloading agent 48 preloading an app, at a preloading step 80. The preloaded app comprises one or more preload-initiated activities that run in the background in processor 44.

At a detection step 84, preloading agent 48 detects a newly-invoked activity associated with the app in question (the app that was preloaded at step 80 above). At an assessment step 88, preloading agent 48 assesses whether the newly-invoked activity is a preload-initiated activity or a user-initiated activity.

If the new activity is assessed to be preload-initiated, preloading agent 48 handles the activity as preload-initiated, at a preload-initiated handling step 92. If, on the other hand, the new activity is assessed to be user-initiated, preloading agent 48 handles the activity as user-initiated, at a user-initiated handling step 96.

In various embodiments, preloading agent may use various techniques for assessing whether a new activity is preload-initiated or user-initiated. For example, if the creation of the new activity is triggered from another activity of the same app, agent 48 may decide that the new activity is likely to be preload-initiated. If not, i.e., if the new activity is not triggered by another activity of the same app, agent 48 may decide that the new activity is likely due to user action. In the Android OS, for example, the Splash activity of an app may send an "intent" to create the Main activity of the same app. If the intent is marked as originating from an activity of the same app, then the new activity is likely due to preload. (Note, however, that if the Splash activity issues the intent without marking its context as being initiated from another activity of the app, then this indication would fail.)

In another embodiment, if screen 56 of user device 24 is OFF at the time the new activity is invoked, then agent 48 may decide that the new activity is likely to be preload-initiated.

In some embodiments, preloading agent 48 does not permit preloading of apps if a certain predefined preloading-blocking condition is met. In this case, preloading is permitted only if the preloading-blocking condition is not met. For example, preloading may be blocked if screen 56 of user device 24 is ON, or if another app is currently running in the foreground. When these conditions are met, the preloading may be blocked since the preloading operation may be visible to the user or may degrade the user experience. In such embodiments, if a preloading-blocking condition is met at the time the new activity was invoked, then agent 48 may decide that the activity is likely to be user-initiated.

In some embodiments, preloading agent 48 decides that the new activity is likely to be user-initiated if the new activity was created more than a predefined time period after preloading of the user application. Otherwise, the new activity may be regarded as preload-initiated. The predefined time period may comprise, for example, N seconds after the beginning of the preloading. As another example, the predefined time period may comprise N seconds (even zero) after completion of the preloading.

The heuristics above are given purely by way of example. In alternative embodiments, any other suitable heuristic can be used. In some embodiments, agent 48 may make a decision (of whether a new activity is preload-initiated or user-initiated) on the basis of a single heuristic. In other embodiments, agent 48 may combine two or more different heuristics.

In some embodiments, agent 48 and the app support an Application Programming Interface (API), using which the app indicates to agent 48 whether the new activity being invoked is preload-initiated or user-initiated. Agent 48 makes the distinction based on the indication provided from the app via this API. In some embodiments, the app provides this information if it is available, which is then used by the Agent; if the information is not available, then the app does not provide the information and the Agent relies on heuristics or other detection methods.

In an example embodiment, the app is only able to indicate that an activity was invoked by the user, in which case agent 48 regards the activity as user-initiated. Otherwise, i.e., if the app does not indicate that the activity was invoked by the user, agent 48 may assume that the activity is preload-initiated. In an example embodiment, the app indicates to agent 48 that an activity is user-initiated when detecting that the activity has come to focus (i.e., became active for the user to interact with). In another example embodiment, the app indicates to agent 48 that an activity is user-initiated when detecting that the activity has moved from the onStop to the onStart lifecycle state (e.g., an onRestart event was triggered).

As noted above, preloading agent 48 handles a newly-invoked activity differently, depending on whether it is assessed to be preload-initiated or user-initiated. In various embodiments, various handling schemes that differ between preload-initiated and user-initiated activities may be used.

In some embodiments, if preloading agent 48 decides that the new activity is preload-initiated, then agent 48 retains the app in a "preloaded" state. If the new activity is determined to be user-initiated, on the other hand, agent 48 removes the app from the preloaded state. For example, the app and agent 48 may support an API, using which agent 48 indicates to the app whether the current state of the app is "preloaded" or not. The indication may comprise, for example, an "isPreloaded" Boolean flag.

Using such an API, the app is able to handle the various activities associated with the app properly, according to its preloaded state. For example, if a new activity is created for a preloaded app (i.e., while the app is in the preloaded state), then the app may skip execution of analytics code that tracks usage of the app by the user (e.g., general app usage, content views and advertisement views). For example, if an ad is preloaded but not seen by the user, then the app should not trigger the analytics tracking to count the ad as being seen.

As another example, if agent 48 indicates to the app that the new activity is preload-initiated, then the app may run the activity transparently in the background without impacting user experience. Transparent running may comprise, for example, inhibiting audio-visual output (i.e., visual and/or audio output) of the activity from being noticeable to the user. If, on the other hand, agent 48 indicates to the app that the new activity is user-initiated, then the app is typically removed from the "preloaded" state. The app thus presents the new activity to the user, and any audio-visual output is presented (displayed and/or played, as applicable).

As yet another example, if the new activity is regarded preload-initiated, processor 44 (e.g., via the app, the OS, or the agent 48) may assign the activity a lower execution priority, relative to if the activity were user-related. Assigning a lower execution priority may comprise, for example, limiting memory (e.g., RAM) and/or computational resources made available to the activity. If, on the other hand, agent 48 indicates to the app that the new activity is user-initiated, then the app is typically removed from the "preloaded" state. The new activity (and possibly other components associated with the app process) may be assigned a higher execution priority (e.g., more memory and/or computational resources).

The activity handling schemes described above are example schemes that are depicted purely for the sake of conceptual clarity. In alternative embodiments, any other suitable handling schemes can be used. Additional examples of handling schemes, which differ between preload-initiated and user-initiated activities, are described in the section entitled "Additional embodiments and variations" further below.

In alternative embodiments, the assessment of whether an activity is preload-initiated or user-initiated is carried out by the app itself (the app with which the activity is associated). In some embodiments, although not necessarily, the app and preloading agent 48 support an API, using which the app requests and receives from agent 48 an indication of whether an activity was invoked by agent 48. In an embodiment, if agent 48 indicates that it had invoked an activity, the app regards the activity as preload-initiated. If agent 48 does not indicate that it had invoked the activity, the app may assume that the activity is user-initiated.

In some embodiments, when the app is in the preloaded state (e.g., isPreloaded=TRUE) the various activities associated with the app are handled (both by the app and by preload agent 48) as preload-initiated. When the app is not in the preloaded state, then the various activities are handled as user-initiated. Thus, detecting the invocation of a user-initiated activity when the app is in the preloaded state would cause the app to move to the non-preloaded state, and this transition might impact not just the handling of the newly invoked activity, but also prior existing activities (e.g., the existing preloaded activity might be terminated).

In alternative embodiments, the "preloaded state" can refer to a specific Activity, i.e., processor 44 may run, at the same time, one or more activities that are in the preloaded state and one or more activities that are not in the preloaded state, all associated with the same app. In these embodiments, detecting the invocation of a user-initiated activity might not affect the handling of the existing preload-initiated activities.

Using Dummy Activities for Transparent Preloading

When preloading apps, it is important to keep the preloading operation, and any effects thereof, hidden from the user. This sometimes requires careful consideration of specific operating system (OS) nuances in the user device. For example, in some user-device OSs, including Android, when the OS terminates ("kills") the task located at the top of the task stack, the next task on the task stack automatically pops to the foreground.

Consider a scenario in which preloading agent 48 preloads an app to the background, and at some stage the OS decides to kill the preloaded app, e.g., due to lack of sufficient resources. This is a common scenario, since background apps are commonly regarded as having relatively low priority. Similarly, for example, the app may have been in the background due to a user "Home" press (i.e., not preloaded) when the OS decides to kill the app.

Although terminated, the OS may maintain a record of the activity for a period of time, which can be used to resurrect the terminated activity. Moreover, the OS may automatically resurrect the terminated activity if the app associated with it is launched or preloaded—which is the case for the Android OS.

According to this scenario, at a later time agent 48 begins to execute preload of the same app. If the activity record of the terminated activity still exists, then the OS resurrects the app and moves the resurrected app to the foreground, causing the preloading app to be seen by the user. The OS also moves the resurrected task to the top of the task stack.

It is possible in principle to prevent the resurrected task from being seen by the user, by immediately killing the resurrected task (if it exists) upon initiating preload. Due to the above-described Android feature, however, killing the resurrected task (which is now at the top of the stack) will cause the next task on the stack (e.g., some other arbitrary app that happens to be in the background) to automatically pop to the foreground and be seen by the user. This behavior is, of course, highly undesirable.

In some embodiments of the present invention, preloading agent 48 overcomes the above scenario and keeps the preloaded app unnoticeable, by creating a transparent dummy activity. The dummy activity may comprise, for example, a single transparent screen, or any other suitable activity that is unnoticeable to the user even when in the foreground. Two example solutions are described below. Alternatively, any other suitable solution, which uses such a dummy activity, can be used.

Solution 1

Before starting preload, agent 48 creates a transparent dummy activity associated with a different task, initiates preload, and then kills the resurrected task if it exists.

(Before killing the resurrected task, the resurrected task was at the top of the stack, followed by the task associated with the dummy activity. Killing the task at the top of the stack (the resurrected task) automatically causes the next task on the stack (in this case the dummy activity) to pop to the foreground. Since the dummy activity is transparent, it is not seen by the user. Without the dummy activity, the activity associated with the next task in the stack (e.g., some other app in the background) would have automatically popped to the foreground when the top task in the stack (the resurrected task) was killed by the OS.) In an embodiment, agent 48 may then move the dummy activity to the background and then kill it.

Solution 2

After starting preload, agent 48 creates a transparent dummy activity associated with a different task, and then kills the resurrected task.

(Before creating the dummy activity, the resurrected task was at the top of the stack. After creating the dummy activity, the dummy activity is at the top of the stack, followed by the resurrected task. The dummy activity is transparent and not seen by the user. Therefore, killing the resurrected task (which is now second from the top of the stack, not at the top) will NOT cause any apps to pop to the foreground. Without the dummy activity, the resurrected activity would be at the top of the task stack, which means that when the resurrected activity is killed, the next app in the task stack would pop to the foreground and would have been seen by the user.)

In an embodiment, agent 48 may then move the dummy activity to the background and then kill it.

Additional Embodiments and Variations

The description that follows outlines various possible features of the preloading operations performed in system 20, e.g., by preloading agent 48 and/or preloading control unit 72.

In various embodiments, preloading agent 48 may use various events and/or inputs for deciding whether and when to trigger preloading of an app. Several non-limiting examples include one or more of the following:

- A notification received from the cloud (e.g., from preloading subsystem 60) that indicates the app should be preloaded.
- Periodic triggering, e.g., preloading of an app once every X minutes.
- Prefetching of app content and/or app data over the network.
- Identifying (e.g., by the operating system of user device 24) that it is a good time to perform prefetching and/or preloading. For example, identification that the user-device modem is being activated for other purposes (thus lowering the power cost of the preloading operation), identification that the user device is currently charging, and/or identification that the user-device battery level is high.

In some embodiments, when triggering preloading of an app, preloading agent 48 may also trigger prefetching of data and/or content associated with the app.

In some embodiments, processor 44 performs certain operations if an app is launched by the user, but not if the app is being launched by preloading agent 48. Several non-limiting examples of such operations are:

- Rendering an app display (e.g., a display associated with an Android activity).
- Fetching and/or displaying of advertisements
- Reporting analytics associated with content display and/or advertisement fetch/display.
- Personalizing an app for a user (e.g., the user-interface display) based on content referenced by the app launch. (For example, an app display may normally be personalized based on which content the user has already accessed. In the case of preload, while the app has been launched, a personalization update should not be triggered since the associated app content has not yet been seen by the user.) In some embodiments, operations that are prevented during preloading are instead executed when the user subsequently activates the preloaded app.

In some embodiments, preloading agent 48 triggers preloading in a manner that ensures that the preload operation will not interfere with normal user activity (e.g., with other apps). Examples may include one or more of the following:

- The preloading agent may only trigger preloading when the user-device screen is off. In this way, any visual indication of the app launch will not be seen by the user. In some embodiments, the preloading agent prioritizes preloading when the user-device screen is off (but possibly does not prevent it entirely when the user-device screen is not off).
- The preloading agent may trigger preloading only when there is no other app in the foreground. In this way, the user experience will not be affected when the user accesses a different app.
- The initial screen of the app, e.g., a Splash screen, may be marked as transparent so that it will not be seen by the user when launched. In an example embodiment, the preloading agent defines a callback function through an API, to be executed by the app when its initial screen launches in order to cause the initial screen to launch transparently.
- A "dummy" initial screen is added to the app. This dummy screen is launched before any other screens are displayed, and it is marked as transparent so that it will not be seen by the user when launched. Here, too, a callback function may be provided by the preload agent through an API to be executed by the app when it begins its preload launch. This callback function launches the initial dummy screen in a transparent way.

In various embodiments, when triggering a preload, processor 44 may execute various operations associated with the app launch. Examples of this may include one or more of the following:

- Loading code and/or app data associated with the app into RAM from memory.
- Initializing the operating-system process associated with the app instance.
- Running one or more initial components of the code (e.g., the code associated with the Android Application class).
- Creating one or more activities associated with the app, and possibly executing one or more operations normally associated with creating these activities.
- Fetching Domain name Service (DNS) information.
- Rendering a visual display (e.g., screen) associated with the app.

As noted above, certain operations that normally execute when an app launches, may be prevented from executing during a preload launch. However, in some of these embodiments, processor 44 may preload (execute in advance) one or more of the operations associated with the prevented operation, save the interim results of these operations, and use the interim results later to speed up a subsequent user-initiated launch. In an example embodiment, although rendering of a visual display (screen) may not be permitted as part of the preload, processor 44 may still perform certain supporting operations as part of the preload. The supporting operations produce interim results to be used when the user activates the app in order to accelerate the app rendering at that time.

An app typically executes predefined code when a state change occurs to one of its screen components (e.g., views, displays). An example of a screen component is an Android activity, and examples of states associated with an Android activity are onCreate, onStart, onResume, onPause, and onStop. In each case, the app developer may define code to be executed when the app transitions between these states. The screen components are referred to below as activities.

In some embodiments, the app executes code (operations) associated with a state change conditionally, depending on whether the activity is preload-initiated or user-initiated. Non-limiting examples of this feature may comprise:

- Activity creation: This refers to the code that should be executed when an app activity becomes active, e.g., when it moves to the onCreate, onStart, and/or onResume states. For example, if the activity is created due to a user activation, then rendering of the activity would normally take place. However, if the activity is created in response to a preload, then rendering of the activity may be skipped.

Move to background: This refers to the code that should be executed when an app activity moves from the foreground to the background, e.g., when it moves from the onResume to the onPause or onStop states. For example, if the user presses Home while an activity is launching in response to user activation (thereby causing the activity to move to the background), then the activity will transition to onPause, and typically pause the execution of the activity launch. However, if the activity is launching in response to a preload request from preload agent 48, then the execution of the activity launch would continue even after the activity is moved to the background as part of the preload.

Move to foreground: This refers to the code that should be executed when an app activity moves from the background to the foreground, e.g., when it moves from the onPause or onStop states to onResume. For example, if a background non-preloaded activity moves to the foreground, then rendering of the activity typically need not be executed again.

However, if a preloaded activity moves to the foreground (i.e., the user activates a preloaded activity) then if rendering was not already executed with the preload, it now needs to be executed.

In each case, the app could determine which code to execute by requesting and receiving from the preload agent an indication of whether the app was preloaded when the state transition took place (e.g., via the API described above).

In another embodiment, a preloaded app activity is moved to the background when being created so as not to impact the user-device activity. However, in many cases, this can only be done once an initial activity associated with the app already exists. Thus, in some embodiments, processor 44 may launch an initial activity of the app "transparently," such that the screen associated with the activity is not visually seen by the user. As discussed above, this initial screen may be a Splash screen associated with the app, in which the app executes a callback function provided via API by the preload agent that marks the Splash screen as transparent when it is being created. Alternatively, this initial screen may be a transparent "dummy" screen introduced by the preloading agent. The dummy screen is launched when app preload is executed, e.g., via a callback function provided by the preloading agent through an API that is executed by the app when a preload launch occurs.

In some embodiments, preloading agent 48 may refresh a preloaded activity in the background. Refreshing may be performed, for example, in response to an update to app data or app content that was previously prefetched to the user device, or in response to some other change that affects the preloaded app state. In some of these embodiments, the refresh is carried out by the preloading agent executing a callback function defined by the app through an API. In further embodiments, the callback function may also return an indication of whether the refresh has completed, and possibly an exit code indicating whether the refresh was successful, or whether a particular refresh error was detected. In some embodiments, the refresh might be carried out by the preloading agent, by killing (terminating) the app process and all associated activities and then preloading the app again with the updated data and/or content. In this approach, a refresh callback function does not need to be provided to the preloading agent.

In some embodiments, an API is defined for the app to indicate whether the preload has completed, and possibly an exit code indicating whether the preload was successful, or whether a particular preload error was detected.

As discussed above, in some embodiments, operations that were skipped at the time of activity preload launch may be executed when the user activates the preloaded activity. One of the examples given above is the rendering of the display associated with the activity. However, the execution of these operations when the user activates the preloaded activity often takes some time—which degrades the user experience. Therefore, in some embodiments processor 44 launches and displays a dummy "filler" activity while the operations needed to move the preloaded app to the foreground are executed.

An example of a "filler" activity may be a screen showing the logo of the app. In one example embodiment, the preloading agent puts the filler activity on the task stack when the app indicates that preload has successfully completed (e.g., via the API described above), so that when the user activates the app, the filler activity will automatically be the first activity to execute.

In some embodiments, if an app that is currently not in the Recents list is preloaded, then the app preload launch (performed by agent 48) comprises preventing the app from appearing in the Recents list (until it is user-activated).

In some embodiments, preloading subsystem 60 defines a preload policy, and sends the policy to agent 48 in user device 24, to help determine when preload should be carried out. Such a policy may specify, for example, which apps and/or in-app content are supported for preload, at what times preload is permitted (e.g., hours of the day, days of the week), a minimum battery level needed to permit preload, a change to preload priority while the device is charging or in response to recent user/device activity, and/or the prefetch status of the content associated with the preload, e.g., whether or not the device already has all the content needed to preload the activity.

The preload policy may also be formulated together with a prefetching policy. Subsystem 60 typically formulates the preload policy for each user device, based on user or user-device reports indicating past app usage, e.g., the user's app clicks along with time stamps and possibly device context. These reports from the users or user devices can be used by machine learning algorithms in subsystem 60 on the network side, to predict which app activities will be accessed by each user, and to construct a preload policy for each user.

In some embodiments, processor 44 in user device 24 runs a Preload-Time Monitor (PTM), possibly as part of preloading agent 48. The PTM identifies and tracks preferred times to carry out preload. Examples of preferred times to carry out preload may be (i) the user-device screen is off, (ii) there is no other user activity taking place (e.g., no app in the foreground), and/or (iii) battery level is above a predefined threshold. Additional rules for when preload is permitted to take place can be set in the preload policy as described above.

In some embodiments, if a preload notification arrives at the user device, preloading agent 48 will not immediately carry out preload if device conditions do not currently permit (e.g., according to the rules established in the preload policy). In this case, the PTM may monitor the user-device status until a preferred time is found for carrying out the preload, e.g., until the user device screen is detected to be off.

In the present context, the term "preload launch of an app activity" refers both to the initial launching of the app in the background (e.g., the launch of the feed or landing page) and/or to the launch of in-app content associated with a link available within the app, such as an in-app article or video or an additional child app residing in the parent app.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a processor of a user device, preloading one or more user applications in a background mode, in which User Interface (UI) screens associated with preloaded user applications are hidden from a user of the user device;
after a given user application has been set to a preloaded state, detecting a UI screen that is invoked in the processor and is associated with the given preloaded user application;
assessing, by the processor, whether the UI screen is a preload-initiated UI screen that is invoked due to preloading of the given user application, or whether the UI screen is a user-initiated UI screen that is invoked due to an action by the user;
if the UI screen is assessed to be a preload-initiated UI screen, handling the UI screen using a first handling scheme; and
if the UI screen is assessed to be a user-initiated UI screen, handling the UI screen using a second handling scheme, different from the first handling schemes,
wherein assessing whether the UI screen is preload-initiated or user-initiated comprises applying a predefined heuristic.

2. The method according to claim 1, wherein assessing whether the UI screen is preload-initiated or user-initiated is performed by a preloading agent, which is configured to preload the user applications.

3. The method according to claim 2, wherein the preloading agent is implemented as one of (i) a software component of an operating system of the user-device, (ii) an application, and (iii) a Software Development Kit (SDK) embedded in an application.

4. The method according to claim 1, wherein assessing whether the UI screen is preload-initiated or user-initiated is performed by the given user application.

5. The method according to claim 1, wherein applying the predefined heuristic comprises assessing that the UI screen is preload-initiated if the UI screen is invoked by another UI screen associated with the given preloaded user application.

6. The method according to claim 1, wherein applying the predefined heuristic comprises assessing that the UI screen is user-initiated if the UI screen is not invoked by another UI screen associated with the given preloaded user application.

7. The method according to claim 1, wherein applying the predefined heuristic comprises assessing that the UI screen is preload-initiated if a screen of the user device is off during invocation of the UI screen.

8. The method according to claim 1, wherein applying the predefined heuristic comprises assessing that the UI screen is user-initiated if the UI screen is invoked more than a predefined time period after preloading of the given user application.

9. The method according to claim 1, wherein applying the predefined heuristic comprises assessing that the UI screen is preload-initiated if the UI screen is invoked less than a predefined time period after preloading of the given user application.

10. The method according to claim 1,
wherein preloading the user applications comprises evaluating a predefined preloading-blocking condition, and permitting preloading of the user applications only if the preloading-blocking condition is not met,
and wherein assessing whether the UI screen is preload-initiated or user-initiated comprises assessing that the UI screen is user-initiated if the preloading-blocking condition is met during invocation of the UI screen.

11. The method according to claim 1, wherein assessing whether the UI screen is preload-initiated or user-initiated comprises receiving from the given preloaded user application, via an Application Programming Interface (API), an indication of whether the UI screen is preload-initiated or user-initiated.

12. The method according to claim 1, wherein handling the UI screen comprises:
sending to the given preloaded user application, via an Application Programming Interface (API), an indication of whether the given user application is currently in a preloaded state; and
in the given preloaded user application, based on the indication, applying the first handling scheme if in the preloaded state, and applying the second handling scheme if not in the preloaded state.

13. The method according to claim 1, wherein handling the UI screen comprises:
if the UI screen is assessed to be user-initiated, executing analytics code that tracks usage of the app by the user; and
if the UI screen is assessed to be preload-initiated, not executing the analytics code.

14. The method according to claim 1, wherein handling the UI screen comprises:
if the UI screen is assessed to be user-initiated, presenting audio-visual output of the UI screen to the user; and
if the UI screen is assessed to be preload-initiated, inhibiting the audio-visual output of the UI screen.

15. The method according to claim 1, wherein handling the UI screen comprises assigning to the UI screen a first execution priority if the UI screen is assessed to be user-initiated, and, if the UI screen is assessed to be preload-initiated, assigning to the UI screen a second execution priority that is lower than the first execution priority.

16. The method according to claim 1, and comprising determining whether or not the given preloaded user application is in a preloaded state, based on whether the detected UI screen is assessed to be preload-initiated or user-initiated.

17. The method according to claim 16, and comprising deciding, based on whether the given preloaded user application is determined to be in the preloaded state, whether to handle at least one other UI screen associated with the given preloaded user application using the first handling scheme or using the second handling scheme.

18. A user device, comprising:
   an interface for communicating over a communication network; and
   a processor, configured to:
      preload one or more user applications in a background mode, in which User Interface (UI) screen associated with preloaded user applications are hidden from a user of the user device;
      after setting a given user application to a preloaded state, detect a UI screen that is invoked in the processor and is associated with the given preloaded user application;
      assess whether the UI screen is a preload-initiated UI screen that is invoked due to preloading of the given user application, or whether the UI screen is a user-initiated UI screen that is invoked due to an action by the user;
      if the UI screen is assessed to be a preload-initiated UI screen, handle the UI screen using a first handling scheme; and
      if the UI screen is assessed to be a user-initiated UI screen, handle the UI screen using a second handling scheme, different from the first handling scheme,
      wherein the processor is configured to assess whether the UI screen is preload-initiated or user-initiated by applying a predefined heuristic.

19. The user device according to claim 18, wherein the processor is configured to run a preloading agent, which is configured to preload the user applications and to assess whether the UI screen is preload-initiated or user-initiated.

20. The user device according to claim 19, wherein the processor is configured to run the preloading agent as one of (i) a software component of an operating system of the user-device, (ii) an application, and (iii) a Software Development Kit (SDK) embedded in an application.

21. The user device according to claim 18, wherein, in the processor, assessing whether the UI screen is preload-initiated or user-initiated is performed by the given user application.

22. The user device according to claim 18, wherein the processor is configured to assess that the UI screen is preload-initiated if the UI screen is invoked by another UI screen associated with the given preloaded user application.

23. The user device according to claim 18, wherein the processor is configured to assess that the UI screen is user-initiated if the UI screen is not invoked by another UI screen associated with the given preloaded user application.

24. The user device according to claim 18, wherein the processor is configured to assess that the UI screen is preload-initiated if a screen of the user device is off during invocation of the UI screen.

25. The user device according to claim 18, wherein the processor is configured to assess that the UI screen is user-initiated if the UI screen is invoked more than a predefined time period after preloading of the given user application.

26. The user device according to claim 18, wherein the processor is configured to assess that the UI screen is preload-initiated if the UI screen is invoked less than a predefined time period after preloading of the given user application.

27. The user device according to claim 18, wherein the processor is configured to:
   evaluate a predefined preloading-blocking condition, and permit preloading of the user applications only if the preloading-blocking condition is not met, and
   assess that the UI screen is user-initiated if the preloading-blocking condition is met during invocation of the UI screen.

28. The user device according to claim 18, wherein the processor is configured to receive from the given preloaded user application, via an Application Programming Interface (API), an indication of whether the UI screen is preload-initiated or user-initiated.

29. The user device according to claim 18, wherein the processor is configured to:
   send to the given preloaded user application, via an Application Programming Interface (API), an indication of whether the given user application is currently in a preloaded state; and
   in the given preloaded user application, based on the indication, apply the first handling scheme if in the preloaded state, and apply the second handling scheme if not in the preloaded state.

30. The user device according to claim 18, wherein the processor is configured to:
   if the UI screen is assessed to be user-initiated, execute analytics code that tracks usage of the app by the user; and
   if the UI screen is assessed to be preload-initiated, not execute the analytics code.

31. The user device according to claim 18, wherein the processor is configured to:
   if the UI screen is assessed to be user-initiated, present audio-visual output of the UI screen to the user; and
   if the UI screen is assessed to be preload-initiated, inhibit the audio-visual output of the UI screen.

32. The user device according to claim 18, wherein the processor is configured to assign to the UI screen a first execution priority if the UI screen is assessed to be user-initiated, and, if the UI screen is assessed to be preload-initiated, assign to the UI screen a second execution priority that is lower than the first execution priority.

33. The user device according to claim 18, wherein the processor is configured to determine whether or not the given preloaded user application is in a preloaded state, based on whether the detected UI screen is assessed to be preload-initiated or user-initiated.

34. The user device according to claim 33, wherein the processor is configured to decide, based on whether the given preloaded user application is determined to be in the preloaded state, whether to handle at least one other UI screen associated with the given preloaded user application using the first handling scheme or using the second handling scheme.

* * * * *